(12) United States Patent
Smith

(10) Patent No.: US 8,086,660 B2
(45) Date of Patent: Dec. 27, 2011

(54) DISTRIBUTED DATA MODEL

(75) Inventor: Geoff Smith, Burwood (AU)

(73) Assignee: Ixia, Calabasas, CA (US)

( * ) Notice: Subject to any disclaimer, the term of this patent is extended or adjusted under 35 U.S.C. 154(b) by 1547 days.

(21) Appl. No.: 10/851,303

(22) Filed: May 21, 2004

(65) Prior Publication Data

US 2005/0259594 A1  Nov. 24, 2005

(51) Int. Cl.
*G06F 15/16* (2006.01)
*G06F 15/173* (2006.01)
*G06F 3/00* (2006.01)
*G06F 9/455* (2006.01)
*G06F 17/30* (2006.01)

(52) U.S. Cl. ........ 709/201; 709/205; 709/224; 709/246; 719/329; 703/27; 707/708

(58) Field of Classification Search .......... 709/200, 709/201–250; 719/328; 707/3
See application file for complete search history.

(56) References Cited

U.S. PATENT DOCUMENTS

| | | | |
|---|---|---|---|
| 4,745,593 A | | 5/1988 | Stewart |
| 5,680,585 A | | 10/1997 | Bruell |
| 5,818,603 A | | 10/1998 | Motoyama |
| 5,822,520 A | | 10/1998 | Parker |
| 5,961,589 A | * | 10/1999 | Hansen .................. 709/205 |
| 6,167,537 A | | 12/2000 | Silva et al. |
| 6,373,822 B1 | | 4/2002 | Raj et al. |
| 6,564,265 B2 | | 5/2003 | Tillmann et al. |
| 6,710,893 B1 | | 3/2004 | Hou et al. |
| 6,862,699 B2 | | 3/2005 | Nakashima et al. |
| 6,928,488 B1 | * | 8/2005 | de Jong et al. .............. 709/246 |
| 7,278,061 B2 | | 10/2007 | Smith |
| 2001/0011215 A1 | * | 8/2001 | Beeker et al. ............... 703/27 |
| 2001/0042062 A1 | * | 11/2001 | Tenev et al. ................. 707/3 |
| 2002/0136210 A1 | | 9/2002 | Boden et al. |
| 2002/0156885 A1 | * | 10/2002 | Thakkar ..................... 709/224 |
| 2003/0142629 A1 | | 7/2003 | Krishnamurthi et al. |
| 2003/0156548 A1 | | 8/2003 | Sapp |

(Continued)

FOREIGN PATENT DOCUMENTS

JP  10-222477  8/1998

(Continued)

OTHER PUBLICATIONS

U.S. Appl. No. 10/266,507, filed Oct. 8, 2002, Geoff Smith, Agilent Technologies.

(Continued)

*Primary Examiner* — Ian N Moore
*Assistant Examiner* — Kiet Tang
(74) *Attorney, Agent, or Firm* — Jenkins, Wilson, Taylor & Hunt, P.A.

(57) ABSTRACT

Method and systems for transferring data from a sending device to a receiving device. The method starts with the preparation of a description of the structure of the data which is provided to the sending device and the receiving device. A reference model of the data structure is created on each of the sending and receiving devices, during run time, using the description of the data. As requested, instances of the reference model are created with the data on the sending device. The data in the instance is serialized by extracting the data and transferred from the sending device to the receiving device. The receiving device creates an instance of the data based on the reference model.

38 Claims, 7 Drawing Sheets

U.S. PATENT DOCUMENTS

2004/0268242 A1 12/2004 Layman et al.
2007/0174852 A1* 7/2007 Smirnov et al. ............... 719/328

FOREIGN PATENT DOCUMENTS

| JP | 2002-108665 | 4/2002 |
| JP | 2003-163712 A | 6/2003 |
| WO | WO03/073390 A1 | 9/2003 |

OTHER PUBLICATIONS

U.S. Appl. No. 10/851,303, filed May 21, 2004, Geoff Smith, Agilent Technologies.
Search Report from the UK Patent Office issued Aug. 25, 2005.
Notice of Allowance and Fee(s) Due for U.S. Appl. No. 10/266,507 (Jun. 11, 2007).
Official Action for U.S. Appl. No. 10/266,507 (Dec. 21, 2006).
Final Official Action for U.S. Appl. No. 10/266,507 (Jun. 19, 2006).
Official Action for U.S. Appl. No. 10/266,507 (Feb. 2, 2006).
Final Official Action for U.S. Appl. No. 10/266,507 (Nov. 10, 2005).
Official Action for U.S. Appl. No. 10/266,507 (Jun. 13, 2005).
TIA/EIA Interim Standard: cdma2000 High Rate Packet Data Air Interface Specification, Telecommunications Industry Association 2000, p. 6-77 (Nov. 2000).
Japanese Official Action for Japanese Patent Application No. 2005-143559 (Oct. 26, 2010).
Japanese Office Action for Japanese Patent Application No. 2005-143559 (May 20, 2011).

* cited by examiner

| Name | Protocol | State | Tester | SUT |
|---|---|---|---|---|
| Port 101/1 | | | | |
| SessionPool1 | BGP-4 | Enabled | 192.1.1.2 | 192.1.1.1 |
| SessionPool2 | BGP-4 | Enabled | 192.2.1.2 | 192.2.1.1 |
| SessionPool3 | BGP-4 | Enabled | 192.3.1.2 | 192.3.1.1 |
| SessionPool4 | IS-IS | Enabled | 192.4.1.2 | 192.4.1.1 |
| SessionPool5 | IS-IS | Enabled | 192.5.1.2 | 192.5.1.1 |
| SessionPool6 | IS-IS | Enabled | 192.6.1.2 | 192.6.1.1 |
| SessionPool7 | OSPF | Enabled | 192.7.1.2 | 192.7.1.1 |

FIG. 6

DISTRIBUTED DATA MODEL

BACKGROUND OF THE INVENTION

Network devices, such as routers, are extensively tested to ensure that erroneous transmissions and fatal errors are minimized. A variety of test devices are available on the marketplace, including the ROUTER TESTER from AGILENT TECHNOLOGIES, assignee of the present application. Such test devices typically monitor the routers response to a variety of simulated input.

The process of routing can be quickly summarized as a node finding the path to every possible destination. Routing is present in everything from layer 1 (the physical layer) on up. The routing that most people are familiar with, however, occurs at layer 3 (the network layer) and as such, only layer 3 (and more specifically) Internet Protocol (IP) routing will be referenced herein. Routers use tables to determine where to forward packets. Updating these tables is a function performed by routing protocols. Each router is responsive to one or more protocols.

Protocols for exchanging routing information connect multiple routers around the world to provide them with a common view of the network through their heterogeneous, though generally consistent routing tables. Routing tables store all information necessary for the router to reach every destination on the network irrespective of size. There are a wide variety of routing protocols used to contribute to the routing tables across a network. Protocols such as BGP, OSPF, RIP and ISIS help to convey a correct and coherent picture of the network to all routers on the network.

Known router testers simulate network traffic using specifically created "test packets" of data that are typical of the live data present on the network. These test packets are transmitted to the network device over a network under test. Parameters tested by traffic simulator systems (including ROUTER TESTER) include routing verification, achievement of Quality of Service (QoS) levels under load, and correct inter-working with other devices. Many of these so-called "packet blasters" also test the ability of the network device to adhere to protocols by formulating and transmitting messages in accordance with the protocols.

FIG. 1 is a block diagram of a traffic simulator test system 100. More particularly, the traffic simulator test system 100 is a general representation of ROUTER TESTER, offered by AGILENT TECHNOLOGIES. ROUTER TESTER is but one example of a router test system and in particular is advertised as a multi-port traffic generation, protocol emulation, and analysis test system for verifying the performance of enterprise, metro/edge, core routing and optical networking devices. The system generally comprises a plurality of protocol emulation cards 102n connected to a system under test, in this case a router 104. Each of the protocol emulation cards 102n generally comprises a processor with associated memory and I/O. The protocol emulation cards 102n are controlled by a computer 106, such as a PC running a WINDOWS environment. The computer 106 is responsive to an interface 108, such as a graphical user interface.

The test packets produced by the protocol emulation cards 102n are built according to the rules and interpretations of communications protocols, such as those defined by the many standards bodies in the industry. There are many communications protocols in use and new protocols continue to be developed. Typically, new protocols are initially developed by equipment manufacturers and are proprietary in nature. Often, the protocols are subsequently adopted by standards bodies for widespread implementation in industry.

The current software architecture associated with traffic simulator test systems requires hard-coding all parts of the protocol emulation solution including the graphical user interface, scripting API, configuration and control components, and the protocol state machine itself. The hard coding required for each protocol has resulted in the use of an enormous amount of human talent to create the large body of code. Much of this code is dedicated to interfacing the computer 106 with each new protocol emulation card 102n.

The traditional approach to interfacing the computer 106 with each new protocol emulation card 102n requires methods and associated parameters to be known at the time the interface is written and hard coded in an interface description language (IDL). Under this paradigm, new methods and parameters are continually being created each time new protocol emulations are written or old protocols are extended. This has resulted in a vast API (application programming interface) containing many hundreds of methods and parameters, resulting in a body of code that is expensive to maintain. Further, the known approaches result in the API being replicated at several different layers, thereby compounding the problems. Thus, each change to the API (no matter how small) requires the updating of a significant amount of code and different levels within the system. One side effect of this approach is that a unique GUI must be generated for each protocol and each update thereof. As with the API, as the number of protocols grow, so do the required GUI implementations.

Efforts are now being made to design generic systems that alleviate some of the foregoing problems. One example is described in co-pending U.S. patent application Ser. No. 10/266,507, Publication No.: U.S. 20040068681 A1, entitled: Building packets of data. U.S. 20040068681 A1, incorporated herein by reference, uses an external XML protocol description to drive a generic PDU encode/decode engine. A next step is to build a generic interface to the protocol emulators that do not require new code or hard coded interfaces changes for each new emulator or change thereto.

One known approach to this problem is the use of an Interface Definition Language (IDL), such as DCOM or CORBA. However, IDLs have proven unsuitable, as they require all details of each interface to be known at compile time. Another option is the use of ASN.1—a language for defining any data structure. Known ASN.1 compilers generate interface code for encoding and decoding such structures. However, like IDL's, ASN.1 is a compile time solution requiring specifically written code for each interface. Another option is using one of the available XML data models, such as DOM (Document Object Model). However, XML data is transmitted as text files which are an inefficient use of bandwidth. Further, XML data usually requires very processor intensive computations along with time consuming parsing. Further, navigation of a DOM structure is slow and does not naturally represent tabular data (which is prevalent in protocol emulator interfaces).

Accordingly, the present inventors have recognized a need for new interface mechanism capable of representing all commands, configuration data, and output from a protocol emulation. Further, such a mechanism should be equally adroit at hierarchical data as with tabular data.

BRIEF DESCRIPTION OF THE DRAWINGS

An understanding of the present invention can be gained from the following detailed description of certain embodiments of the present invention, taken in conjunction with the accompanying drawings of which:

FIG. 6 is a screen capture of an interface constructed based on a table structure defined in a parcel definition.

Figure 1:
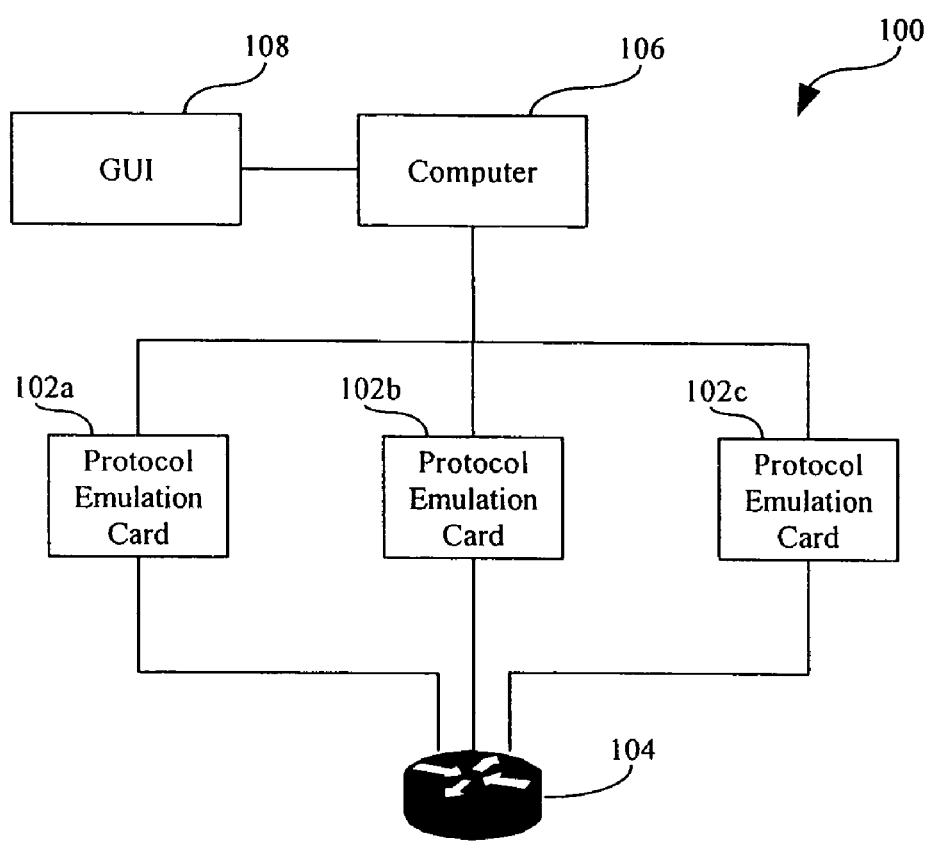
FIG. 1 is a block diagram of a traffic simulator test system.

In the description contained hereinafter, the use of a lowercase "n" adjacent to an element identifier denotes a non-specific instance of the element rather than a specific element as shown in the figures or discussed in the specification with a non-italicized letter adjacent to the element number.

DETAILED DESCRIPTION

Reference will now be made to embodiments of the present invention, examples of which are illustrated in the accompanying drawings, wherein like reference numerals refer to like elements throughout. The detailed description which follows presents methods that may be embodied by routines and symbolic representations of operations of data bits within a computer readable medium, associated processors, data generation and acquisition cards, and the like. A routine is here, and generally, conceived to be a sequence of steps or actions leading to a desired result, and as such, encompasses such terms of art as "program," "objects," "functions," "subroutines," and "procedures." These descriptions and representations are the means used by those skilled in the art effectively convey the substance of their work to others skilled in the art. For the sake of convenience, the word "network" will hereinafter in the description and claims be used to refer to any one or more of: a communication network, a network device, any other communication device, and any aspect or aspects of a communication system which can be tested using test packets of data.

Embodiments which comprise methods will be described with respect to implementation on a router tester having a configuration similar to the AGILENT ROUTER TESTER, but the methods recited herein may operate on any of a variety of router testers. More to the point, the methods presented herein are not inherently related to any particular device; rather, various devices may be used with routines in accordance with the teachings herein. In particular the methods described herein for transfer of data from one device to another, while being described with respect to router tester function, may be applicable to the data communication field in general. Machines that may perform the functions described herein include those manufactured by such companies as AGILENT TECHNOLOGIES, INC., HEWLETT PACKARD, and TEKTRONIX, INC. as well as other manufacturers of communication equipment.

With respect to the software described herein, those of ordinary skill in the art will recognize that there exist a variety of platforms and languages for creating software for performing the procedures outlined herein. Embodiments of the present invention can be implemented using any of a number of varieties of C, including $C^{++}$. However, those of ordinary skill in the art also recognize that the choice of the exact platform and language is often dictated by the specifics of the actual system constructed, such that what may work for one type of system may not be efficient on another system. It should also be understood that the routines and calculations described herein are not limited to being executed as software on a computer, but can also be implemented in a hardware processor. For example, the routines and calculations could be implemented with HDL (Hardware Design Language) in an ASICS or in an FGPA using a variety of design tools.

Method for Transferring Data

Figure 2:
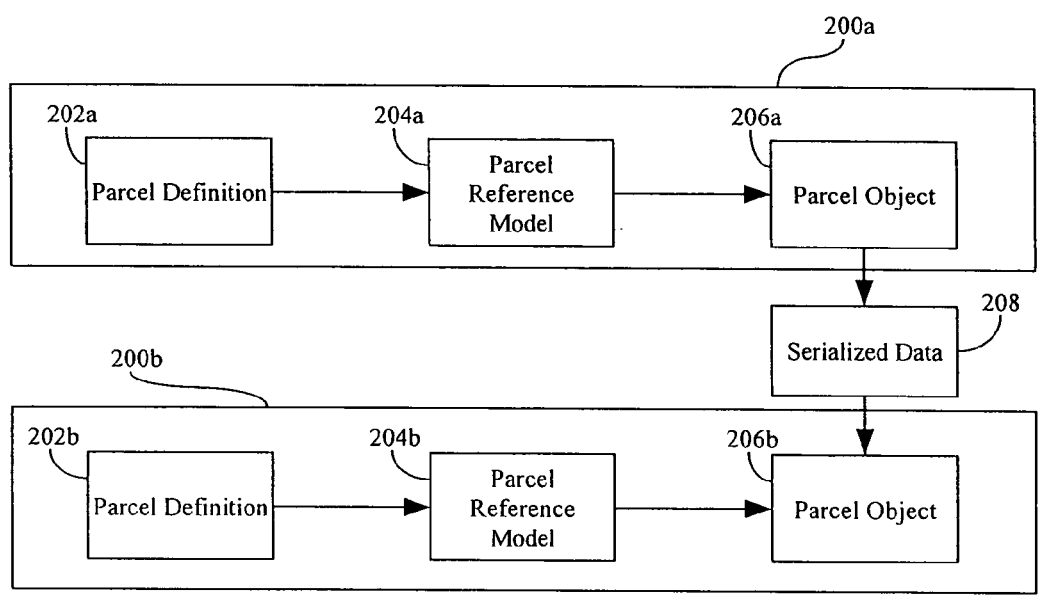
FIG. 2 is a block diagram generally illustrating a method for transferring data in accordance with an embodiment of the present invention.

FIG. 2 is a block diagram generally illustrating a method for transferring data in accordance with an embodiment of the present invention. The illustrated method is for transferring data from a first location 200a to a second location 200b. In the context of protocol emulators, as shown in FIG. 1, the first location 200a can be thought of as a computer 106 (or "client") running the control applications and the second location can be thought of as the protocol emulation card 102n (or "server") running services applications. The control applications include the graphical user interfaces along with communication routines for transmitting and receiving data. The services applications include protocol emulation applications along with communication routines for transmitting and receiving data.

For convenience, the data structures used by the described embodiments of the present invention will be referred to as "parcels." A parcel can be thought of as a flexible, annotated data structure capable of representing commands, configuration data and output from any routine. Parcels created by the client would contain: commands; session data; and topology. Parcels created by the protocol emulation card would contain: statistics; topology; and message trace.

The transfer method, illustrated in FIG. 2, starts with a parcel definition 202a (also referred to herein as a "definition" or "description"). A parcel definition 202n provides a description of the elements of one or more parcels along with attributes thereof. The preferred data structure of a parcel is hierarchical, wherein each node can contain a value, sub nodes, a function, an array of values or a table of values. A parcel definition 202a may be as simple as a text file that provides a list of parcels and specifies the elements (referred to herein as the "nodes") that comprise each parcel, the type of each node and the interrelationship of the nodes. Each node may be annotated using descriptive attributes (examples of which are discussed herein after).

It may be preferable, but not necessary, to formulate the parcel definition 202a in XML. More specifically, it is desirable to format the parcel description in an easily accessible format to facilitate creation and modification thereof. The nested tag structure provided by XML facilitates the documentation of hierarchal relationships and table structures. The parcel definition 202a is generally stored on the first location 200a and is retrieved at run time by applications running on the first location 200a.

The parcel definition 202a is parsed to create a parcel reference model 204a (also referred to as a "reference model"). In general, the parcel reference model is a data structure, such as in C++, from which instances of a parcel, e.g. the parcel object 206b, can be created, or instantiated. Perhaps the closest analogous structure would be a generic type in C++. One difference is that while generic types must be defined at compile time, parcels can be introduced during run time. With parcels, the type is defined by the reference model 204a from which the actual parcel is derived. In use, it may prove beneficial to parse all parcel definitions 202n at system startup so as to generate a reference model of all potential parcels that may be required during operation. However, if time and storage are considerations, it may be advisable to generate only those reference models that are likely to be needed for the current session.

Parcel objects may be managed using a Parcel API, described hereinafter, that can provide a generic interface for working with parcel data. In the context of the present invention, one method for working with parcels is serializing them for communication to the second location 202b. Parcel may be serialized into a variety of forms including XML suitable for save/restore purposes and binary form suitable for communication with other locations. Conceptually, serialization can be thought of as stripping the data from the data structure, and forming a linear file or data stream for transmission. Enough data structure is provided to identify the reference model 204n that should be used to decode the binary stream and recreate the parcel on the receiving side. During this reconstruction, the structural information contained in the reference model 204n is used to parse the data in the binary stream.

Accordingly, the second location 200b is provided with a copy of the parcel definition 202a—shown as the parcel definition 202b. The second location 200b parses the parcel definition 202a to generate a reference model 204b, which should be a copy of the reference model 204a. Upon receipt of the binary data 208, the second location 200b forms a parcel object by instantiating the parcel reference model 204b and populating the resultant data structure with the binary data 208.

A similar process can be used to form parcel objects. The parcel definition 202a may be used to generate a graphical user interface with the appropriate input mechanisms, e.g. text entry fields, radio buttons, etc. . . . for each of the defined elements. Once the user supplies the desired input data, the reference model 204n is instantiated and the parcel is object 206n is populated with the input data. Advantageously a generic API may be devised, examples of which are disclosed herein below, that can handle the creation and maintenance of any parcel object 206n for which a parcel definition 202n is provided.

In contrast to IDL based solutions, a parcel is defined externally to the compiled code and uses a generic API that does not need to be changed as new parcels are defined. This allows an application framework to be built that can cater for future protocol solutions without having to change or grow the framework. It also allows the creation of a stable interface for third parties or customers to build their own solutions on. In contrast to conventional XML solutions, parcel structure is defined once, up front—not for every data packet received. Required parcel reference models may be built at application start up time, alleviating need to continually parse XML. Parcels may be designed for efficient navigation and searching is minimized, by contrast with the XML DOM. Parcels may be designed for efficient binary encoding and decoding requiring relatively small, as compared with XML text, binary data packets for communicated between software systems. Parcels may be designed to encompass tabular data providing a natural fit with many applications.

Use of Parcels in a Protocol Emulator

Figure 3:
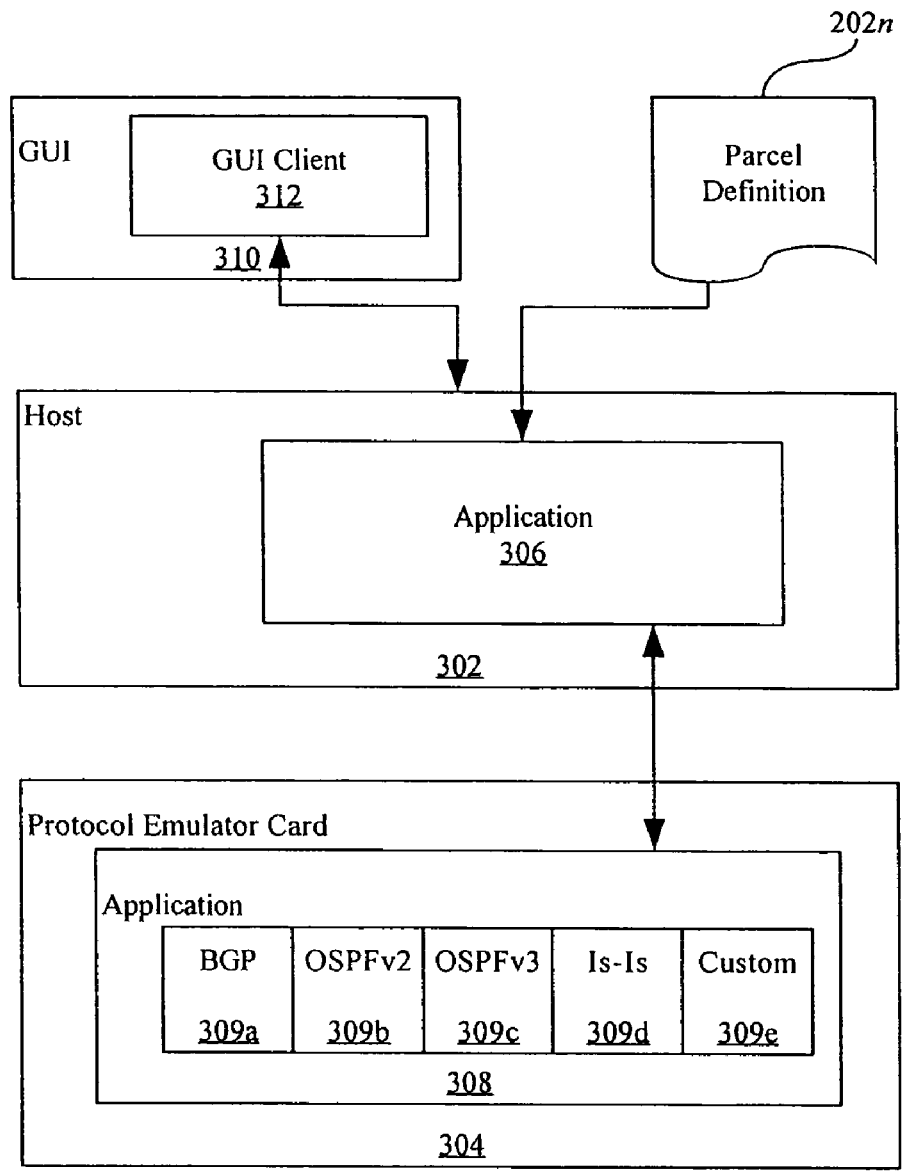
FIG. 3 is a block diagram of a protocol emulation system in accordance with a preferred embodiment of the present invention.

FIG. 3 is a block diagram of a protocol emulation system 300 in accordance with a preferred embodiment of the present invention. The system 300 generally comprises a host 302, such as a personal computer running a version of the MICROSOFT WINDOWS system, and at least one protocol emulator card 304 (also referred to as a protocol emulator), which generally comprises a processor with associated memory and I/O facilities. It may prove beneficial for the protocol emulator to resemble a personal computer in architecture. In accordance with at least one embodiment, the host 302 may be configured as a client while the protocol emulator 304 may be configured as a server.

The host 302 runs an application 306, among other applications and the operating system, that provide routines for the control of the protocol emulator 304 and specifically for communication with the protocol emulator card 304. In accordance with at least one embodiment, the application is a generic protocol independent application. This means that the application 306 preferably lacks any protocol specific functionality. Such functionality is, in effect, created dynamically using the parcel definitions 202n. The application 306 is responsible for the creation, maintenance use of the parcel reference models 204n (see FIG. 2), along with the serialization, transmittal, reception and de-serialization of the data contained in instances of the reference models, e.g. the parcel objects 206n. As noted, it may be preferable to provide an API-like interface to these functions, thereby providing a single generic interface to each different protocol emulation.

A graphical user interface 310 is provided such that when a user requests that a protocol emulation be started, the application 306 will interact with a client 312, in the graphical user interface 310, to display forms for the entry of parameters needed to control the protocol emulator 304. This may be accomplished using the parcel definition 202n or the parcel reference model 204n (see FIG. 2). Once the appropriate data has been entered, the application 306 creates an instance of the reference model 204n to form a parcel object 206n. The application 306 serializes the parcel object 206n and transmits the serialized object to the protocol emulator 304.

The protocol emulator 304 runs an application 308, among others, which includes modules for the emulation of selected protocols 309n. In accordance with at least one preferred embodiment, the application 308 includes routines for communication with the host 302 using parcels. In general, it may be preferable that the application 308 includes routines similar to those contained in the application 306. This may be accomplished by the creation of generic API-like routines that interface with parcels. Examples of such routines will be provided herein below.

The protocol emulator 304 should be periodically provided with updated copies of the parcel definitions 202n. It may be beneficial for the host 302 to provide the definitions 202n to the protocol emulator 304 upon each start up. The protocol emulator 304 upon receipt of the parcel definitions 202n created a set of parcel reference models 204n from which parcel objects 206n can be instantiated. When a serialized parcel object is received from the host 302, a new parcel object is instantiated based on the associated parcel object 206n. This object is then used to provide the data required by protocol emulation routines running on the protocol emulator 304. Thus, when new protocol emulations are added to the protocol emulator 304, only a new parcel definition 202n need be defined to permit communication between the host 302 and the protocol emulator 304 (and the module 309n).

Parcels

While the following discussion will focus on one embodiment of a parcel, those of ordinary skill in the art will recognize that departures from the described parcel structure are possible and will still fall within the scope of the invention. In the described embodiment, parcels generally comprise a header and a set of elements. Elements generally fall into two categories, container elements that provide structure and data elements that store a value or series of values. An example of a set of element (or "node") types for a parcel are shown in TABLE 1.

TABLE 1

| Element Type | Container | Description |
| --- | --- | --- |
| value | No | A single value. (Boolean, Numeric or string). A value may be any length. |
| array | No | A set of homogeneous values (all the same type) |
| set | Yes | A parcel element containing other parcel elements, e.g. value, array, set, table or keyed table. |
| table | Yes | A table. Each member of the table represents a column. Rows in the table are indexed. |
| keyed table | Yes | A table. Each member of the table represents a column. One column, which must be a value, is specified as the key column. Each row in the table must have a unique value in the key column. Rows are accessed by key value. |

Each element may be annotated using descriptive attributes. Such attributes document the parcel, allowing the parcel to be self-documenting. By storing the attributes with the parcel definition and perhaps the parcel reference model, the routines provided to manipulate and interface with parcel may be generic in nature, e.g. the data structure is not coded in the routines, rather the data structure is provided during run-time. For example, attributes can be used to provide all the information needed to present and edit any parcel using a generic graphical user interface. Some examples of possible attributes are shown in Table 2. Those of ordinary skill in the art will recognize that the list present in table 2 is not exhaustive, but that other attributes may prove beneficial depending on the implementation of the present invention.

TABLE 2

| Attribute | Purpose |
| --- | --- |
| fullName | GUI presentation name for the parcel element |
| description | Description of purpose and usage |
| length | For value and array elements, the length attribute defines the number of bits required to hold the value. |
| format | The presentation format. Defined formats include "integer", "hex", "Boolean", "ipv4_address" etc. |
| minValue/ maxValue | Allowed value ranges, allowing the GUI or API to perform automated range checking |

Table 3 contains an example of a parcel definition in XML. In particular, Table 3 contains the definition of two parcels: bgpSessionData, and routePools, along with two commands: addIpv4RoutePool, and addIpv6RoutePool. The parcel bgp defines the startup data needed to create a bgp emulation session. The parcel routePools defines a set of reachable addresses to be advertised by a routing protocol. Two tables are defined within routePools: one for IPv4 addresses, and one for IPv6 addresses. The range of addresses are parametrically defined using a start address, prefix length and count. The commands references the routePools parcel to populate its contents. The commands use a selected row from a route pool table as parameters.

TABLE 3

```
<!-- ================================================ -->
<parcel name="bgpSessionData"
    fullName="BGP4 Session Data"
    class="sessionData"
    flow="toServer"
    buffer="newest">
    <value name="local_port"
        fullName="Local port"
        purpose="localPort"
        length="16"
        format="integer"
        defaultValue="179"/>
    <value name="remote_port"
        fullName="Remote port"
        purpose="remotePort"
        length="16"
        format="integer"
        defaultValue="179"/>
    <value name="subinterface"
        fullName="Sub-interface identifier"
        purpose="subinterface"
        length="32"
        format="integer"/>
    <value name="prefix_length"
        fullName="Address prefix length"
        format="integer"
        purpose="prefixLength"
        length="32"
        defaultValue="24"/>
    <value name="local_ip"
        fullName="Source IP Address"
        format="ipv4_address"
        purpose="localAddress"
        length="32"/>
    <value name="remote_ip"
        fullName="Destination IP Address"
        format="ipv4_address"
        purpose="remoteAddress"
        length="32"/>
</parcel>
<!-- ================================================ -->
<parcel name="routePools"
    fullName="Route Pools"
    class="destinationPools">
    <table name="ipv4Pools"
        fullName="IPv4 Route Pools">
        <value name="v4StartAddr"
            fullName="Start Address"
            length="32"
            format="ipv4_address"/>
        <value name="v4PrefixLen"
            fullName="Prefix Length"
            minValue="1"
            maxValue="32"/>
        <value name="v4Count"
            fullName="Count"/>
    </table>
    <table name="ipv6Pools"
        fullName="IPv6 Route Pools">
        <value name="v6StartAddr"
            fullName="Start Address"
            length="128"
            format="ipv6_address"/>
        <value name="v6PrefixLen"
            fullName="Prefix Length"
            minValue="1"
            maxValue="128"/>
        <value name="v6Count"
            fullName="Count"/>
    </table>
</parcel>
<!-- ================================================ -->
<command name="addIPv4RoutePool"
    fullName="Add an IPv4 route pool"
    instance="session"
    purpose="debug">
    <use rowRef="routePools:ipv4Pools"/>
```

TABLE 3-continued

```
    </command>
    <command name="addIPv6RoutePool"
        fullName="Add an IPv6 route pool"
        instance="session"
        purpose="debug">
        <use rowRef="routePools:ipv6Pools"/>
    </command>
<!-- =============================================== -->
```

Often default values for elements need to be set which vary according to other values specified internally or externally of the definition. In such cases it may be beneficial to integrate Tool Command Language (TCL) procedures that can be invoked to perform such tasks. Such function can be specified in the XML parcel definition. Integration of TCL is within the capabilities of those of ordinary skill in the art and as such the specific details of such integration will not be discussed herein. An example of a portion of a parcel definition incorporating TCL functions is shown in Table 4:

TABLE 4

```
<value name="holdTimer" fullName="Hold Timer" length="16"
    defaultValue="30"/>
<value name="keepalive" fullName="Keepalive Value" length="16"
    valueFunction="multiply :holdTimer 2" />
```

In this example, the default value for keepalive is maintained at twice the holdTimer, no matter what value is set for holdTimer. The TCL functions can be executed when instantiating a parcel, e.g. creating an instance of a parcel. Further, routines can be created to review the parcel definition and/or model and update the values affected by such functions during runtime.

Working with Parcels

Figure 4:
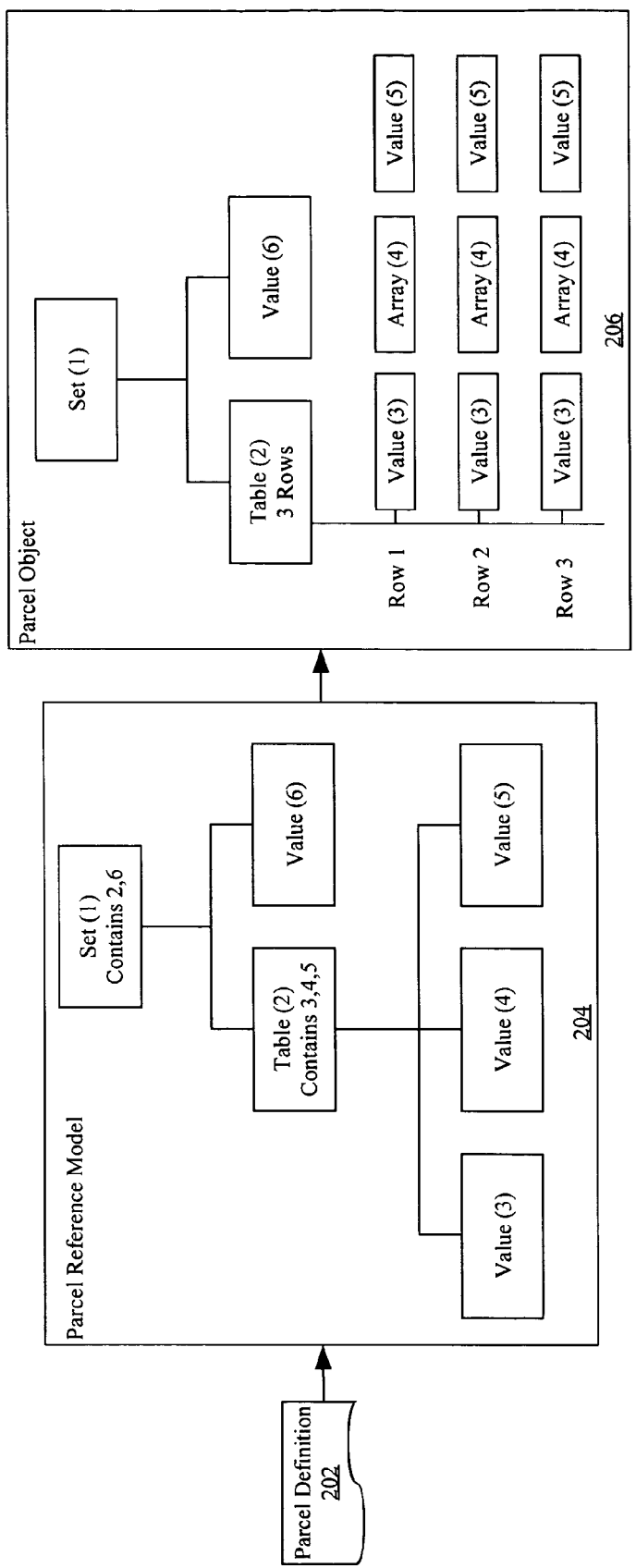
FIG. 4 is a block diagram illustrating the use of a parcel definition to create a parcel reference model and a parcel object in accordance with an embodiment of the present invention.

FIG. 4 is a block diagram illustrating the use of a parcel definition 202 to create a parcel reference model 204 and a parcel object 206 in accordance with an embodiment of the present invention. In general terms, the reference model 204 serves as a repository for all parcel attributes including details of the data structure. In the described embodiments, the structures include hierarchical nodes and basic tables, however the invention is not limited to those structures and may be expanded to include, for example, relational structures. In addition, the reference model 204 resolves all cross-references in the XML between one parcel or parcel node and another.

Figure 5:
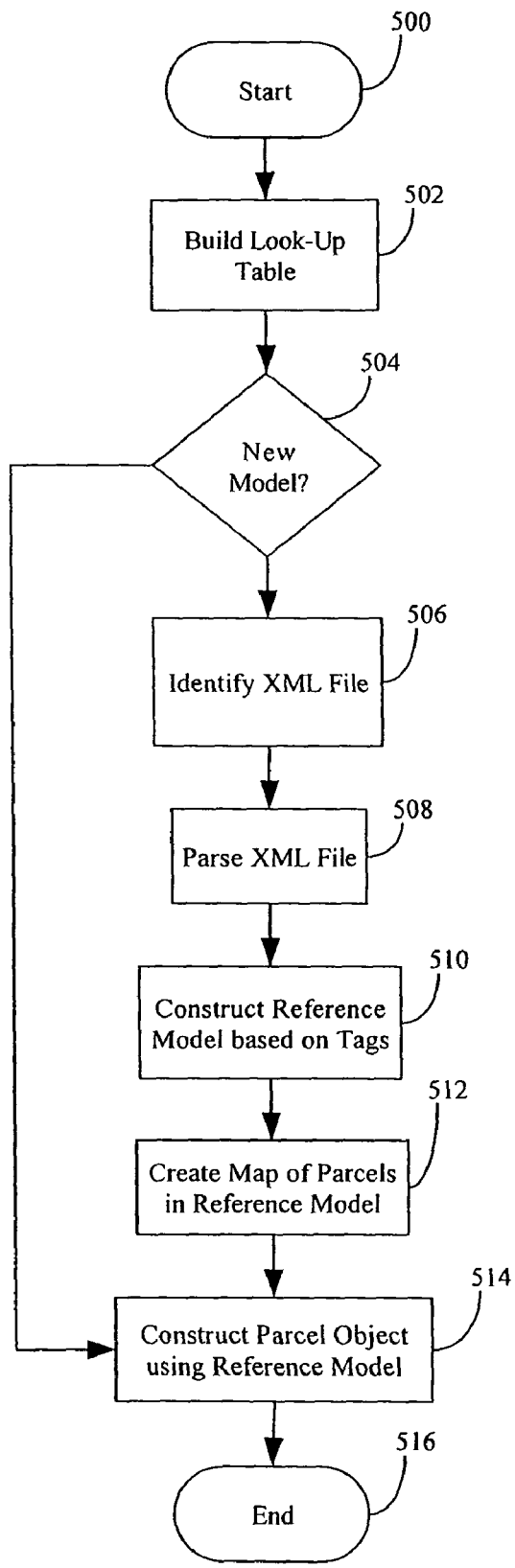
FIG. 5 is a flowchart of a method for creating a parcel object.

FIG. 5 is a flowchart of a method for creating a parcel object 206. The method starts in step 500. In step 502, the available XML parcel definition files (e.g. the parcel definition files 206) are scanned for <parcel> tags and a look-up table of tag names to files is built.

In step 504, if a parcel object 206 is requested for which a parcel reference model 204 has not been formed, the method proceeds to step 506. Otherwise the method proceeds to step 514 discussed herein below. In step 506, the lookup table built in step 502 is scanned to identify the XML file corresponding to the parcel object 206 requested. Next in step 508, the identified XML file is parsed, for example using a public domain XML parser software such as expat. The XML parser generates a vector of C++ tag objects which are used to construct the associated reference model 204 in step 510.

Referring to the example shown in FIG. 4, the reference model 204 contains a top level node, set (1), which contains a table node (2) and a value node (6). The table node (2) contains three nodes: a value node (3), an array node (4) and a value node (5). In the example parcel object 206, twelve nodes are created by creating 3 rows of the table node (2).

It may be beneficial to parse all XML files at startup time to ensure that all models are available for the entire session. However, this may prove to be unnecessary as a given test session may require only a subset of parcels. Therefore it may prove beneficial to parse on demand as is described with respect to FIG. 5.

In step 512, a map is created and associated with the reference model 204 that maintains a map of reference parcel objects, i.e. parcel objects described by the reference model 204, indexed by name. This is desirable as a single reference model 204 may contain the description of a plurality of reference parcel objects. The map may be used to retrieve an appropriate reference model 204 (or portion thereof) describing the desired parcel when a parcel object 206 is to be instantiated.

Next in step 514, the reference model 204 is passed to a routine that constructs the parcel object 206. In this way a new parcel object 206 is created, in effect instantiated, from the associated reference model 204. Generally, a parcel object 206 comprises a header indicating the associated reference model 204, and a data structure for holding the data related to the elements described in the reference model 204. When first created, where available the data structure can be populated with default values defined in the attributes. Where needed, values can be updated or entered by a user or another routine.

Each node in the parcel object 206 has a corresponding reference parcel node. However, the presence of tables means that the correspondence is not necessarily one to one. This is because a parcel object 206 may have multiple instances of a particular node—one for each row in the table. The parcel object 206 does not need to (but may) include the attribute information contained in the reference model 204. Attribute information, when required, may be obtained from the reference parcel 204.

Assigning an index to each node in the parcel can facilitate efficient navigation between nodes of the parcel object 206. The number in parenthesis in each node in FIG. 4 shows an example of an indexing system. In the reference model, 204, each reference node is allocated an index. Each reference node that is a container, such as a set or table, can be configured to record the indices of its member nodes. Each node in a parcel object, 206, acquires the same index as its corresponding reference node, 204. A parcel index vector of active nodes in a parcel object 206 may be used for efficient navigation of nodes in the object. Each active node records its index in the vector. In the case of tables, the existence of multiple rows (and hence node instances) may be managed by designating a current (or selected) row in the table. When a row is selected, the nodes in the selected row register themselves with the parcel index vector. In this way, only the nodes in the current row may be navigated—a row must be selected before nodes can be accessed.

To facilitate understanding of the process for converting a parcel definition in to a parcel model, the following tables are presented. Table 6 shows a partial parcel definition (encompassing three individual parcels) while Table 7 is a conceptual example of a reference model based on the parcel definition contained in Table 6.

TABLE 6

```
<parcel name="sessionSummary"
    <table name="sessions">
        <value name="Name"/>
        <value name="Tester"/>
        <value name="SUT"/>
    </table>
</parcel>
<parcel name="bgpData">
    <value name="localip"/>
    <value name="remoteip"/>
```

TABLE 6-continued

```
</parcel>
<parcel name="bgpRoutes">
    <value name="start"/>
    <value name="increment"/>
    <value name="count"/>
</parcel>
```

TABLE 7

| Parcel sessionSummary | Parcel BGP4 | Parcel bgpRoutes |
|---|---|---|
| Ref node "sessionSummary" type=APF_NODE_TYPE_SET index = 0 | Ref node "bgpData" type=APF_NODE_TYPE_SET index = 0 | Ref node "bgpRoutes" type=APF_NODE_TYPE_SET index = 0 |
| Ref node "sessions" type=APF_NODE_TYPE_TABLE index = 1 | Ref node "localip" type=APF_NODE_TYPE_VALUE index = 1 | Ref node "start" type=APF_NODE_TYPE_VALUE index = 1 |
| Ref node "Name" type=APF_NODE_TYPE_VALUE index = 2 | Ref node "remoteip" type=APF_NODE_TYPE_VALUE index = 2 | Ref node "increment" type=APF_NODE_TYPE_VALUE index = 2 |
| Ref node "Tester" type=APF_NODE_TYPE_VALUE index = 3 | | Ref node "count" type=APF_NODE_TYPE_VALUE index = 3 |
| Ref node "SUT" type=APF_NODE_TYPE_VALUE index = 4 | | |

As a parcel is, in effect, a self documenting data model, a group of generic routines may be formulated to interface with the parcels. Such routines may be thought of as application program interfaces (APIs) in terms of their functions. It is desirable to provide routines for the creation, e.g. instantiation, of parcels, the reading of parcels and the writing of parcels. Table 8 provides examples of routines, using self-documenting code, that describe a generic interface to parcels, including read and write interfaces.

TABLE 8

```
#ifndef APF_PARCEL_H
#define APF_PARCEL_H
// ========================================================================
//
// = LIBRARY
//     APF Agilent Protocol Framework
//
// = FILENAME
//     ApfParcel.h
//
// = DESCRIPTION
//
// Parcel interface
//
// = AUTHORS
//     Geoff Smith
//
// = COPYRIGHT
//     (C) Copyright 2004 Agilent Technologies
//
// ========================================================================
#include "emuframework/include/apfEmulationReference.h"
//-----------------------------------------------------------------
// = TITLE
//     Parcel Read Interface
//
// = CLASS TYPE
//     Interface
//
```

TABLE 8-continued

```
// = DESCRIPTION
//      Read Interface to a parcel instance. This interface is used for
// parcels retrieved from the destination parcel store.
class APB_EXPORT_CLASS IApfReadParcel
{
public:
    virtual ~IApfReadParcel( ) { }
    // = PROPERTIES
    virtual IApfRefParcel*
    refParcel( ) const = 0;
    virtual EApfParcelState
    parcelState( ) const = 0;
    // = PARCEL ITERATION
    virtual uint32_t
    currentIteration( ) const = 0;
    virtual void
    iterateParcel(uint32_t aIteration = 0) = 0;
    // Note: the max iteration is a property of the emulation.
    // It is not enforced by the parcel
    // = CURRENT NODE
    virtual IApfRefNode*
    refNode( ) const = 0;
    virtual EApfNodeType
    nodeType( ) const = 0;
    virtual bool
    isActive( ) const = 0;
    // Query whether or not the current node is active. An inactive node
    // has no value. It corresponds to a node that fails a selectRef,
    // or table columns nodes or decendents for a table with no rows.
    virtual bool
    isCopyRowSource( ) const = 0;
    // Query whether the current node is a set, or a table with a current row.
    // Use this method to check whether this parcel is ready for
    // copying a row to another parcel using copyRow
    // = NAVIGATION
    // The parcel is a hierarchical collection of nodes, which may be values, arrays,
    // sets or tables (See nodeType( )). The root parcel node is similar to a set.
    // The parcel maintains an internal cursor which is used to navigate the parcel
    // hierarchy.
    // Most parcel operations are dependent on the current cursor location.
    // For example, nodeType( ) returns the node type of the current node, and getValue( )
    // returns the value of the current node. So, to use the parcel API, the cursor
    // must be moved to the node of interest.
    // Each level of the parcel hierarchy defines an cursor scope. Operations such as
    // resetFirst( ), next( ), prev( ) and goto*( ) work within the current cursor scope.
    // Scope operations such as enter( ), leave( ), resetTop( ) and find*( ) move the
    // cursor between scopes.
    // For example, after a resetTop( ), the cursor will be at the root parcel node. There
    // is only one node at this level, an enter( ) is needed to move down to the top level
    // members of the parcel. The next( ) and prev( ) operators may then be used to
    // will move the cursor among the members at this level.
    // The members of a table represent the table columns. The parcel cursor is moved
    // from one column to the next. Separate table operations are provided to move between
    // table rows.
    virtual void
    resetFirst( ) const = 0;
    virtual void
    resetLast( ) const = 0;
    virtual bool
    isStart( ) const = 0;
    virtual bool
    isEnd( ) const = 0;
    virtual void
    next( ) const = 0;
    virtual void
    prev( ) const = 0;
    // Cursor scope operations
    virtual void
    resetTop( ) const = 0;
    // Reset the cursor to the first member of the parcel
    virtual void
    enter( ) const = 0;
    // Enter a set or a table column. If the table has no rows, the cursor is positioned
    // off the end.
    virtual void
    leave( ) const = 0;
    // Leave a set or a table column
    virtual EApbResult
    getCursor(int& theCursor) const = 0;
    // Save the cursor for the current element
```

TABLE 8-continued

```
// Returns:
// APB_RESULT_FLOATING_NODE: The cursor is positioned inside a table row and may not
//    return to the same node instance if the current table row is changed.
// APB_RESULT_INVALID_OPERATION: The cursor is not positioned on a node (theCursor == -1)
virtual EApbResult
setCursor(int aCursor) const = 0;
// Set the cursor to the node saved using getCursor( ).
// It is OK to reuse a cursor on another parcel of the same ref type, but the node instance
// is dependent on the current row if getCursor returned APB_RESULT_FLOATING_NODE.
// Returns:
// APB_RESULT_FLOATING_NODE: The cursor is positioned inside a table row and may not
//    be at the original node instance if the current table row was changed.
// APB_RESULT_INVALID_OPERATION: The cursor is not positioned on an existing node
// = SEARCHING
// goto methods move cursor to matching node in the current cursor scope
// If found, return true. If not found, return false and leave cursor unchanged.
virtual bool
gotoName(const AtoString& aName) const = 0;
virtual bool
gotoPurpose(EApfValuePurpose aPurpose) const = 0;
virtual bool
gotoRefNode(const IApfRefNode* aRefNode) const = 0;
// find methods search the entire parcel across all scopes.
// If found, return APB_RESULT_OK or APB_RESULT_FLOATING_NODE and move cursor to found node.
// If not found, return APB_RESULT_NO_DATA and leave cursor unchanged.
virtual EApbResult
findName(const AtoString& aName) const = 0;
virtual EApbResult
findPurpose(EApfValuePurpose aPurpose) const = 0;
virtual EApbResult
findRefNode(const IApfRefNode* aRefNode) const = 0;
// ----------------------------------------------------------------
// Parcel Node operations. Methods are provided for working with
// values, arrays and tables. These methods must be used in the correct
// context as follows:
// value nodes: nodeType must be APF_NODE_TYPE_VALUE
// array nodes: nodeType must be APF_NODE_TYPE_ARRAY
// table nodes: parentNodeType must be APF_NODE_TYPE_TABLE
// keyed table: parentNodeType must be APF_NODE_TYPE_KEYED_TABLE
// General return codes:
// APB_RESULT_INACTIVE_NODE - node is currently inactive, so operation is not available
// APB_RESULT_RANGE_ERROR - operation exceeded count or value range specified in XML
// APB_RESULT_INVALID_OPERATION - operation does not match the node type
// = VALUE NODES
virtual EApbResult
valueGet(CApbValue& aValue) const = 0;
virtual EApbResult
valueGet(uint32_t& aIntValue) const = 0;
// Returns APB_RESULT_VALUE_RANGE_ERROR if the value length is greater than 32 bits.
virtual const AtoByteString&
valueByteString( ) const = 0;
// Asserts if cursor is not at a value node
// An increment can be specified to automatically construct an incrementing
// set of parcels. The parcel count is specified globally for the parcel,
// using IApfWriteParcel::setIterationCount( ).
virtual EApbResult
valueGetIncrement(CApbValue& aIncrement) const = 0;
// = ARRAY NODES
// It is an error to call the array methods when the cursor is not
// at an array
virtual uint32_t
arrayCount( ) const = 0;
// Get count of number of items in the array
virtual EApbResult
arrayGetValue(CApbValue& aValue, uint32_t aIndex) const = 0;
virtual EApbResult
arrayGet(AtoList<CApbValue>& aList) const = 0;
virtual EApbResult
arrayGet(AtoVector<CApbValue>& aVector) const = 0;
// = TABLE & KEYED TABLE NODES
// Table methods must only be used when the cursor is at a table node.
// Note that there are different methods for keyed and unkeyed tables.
virtual uint32_t
tableRows( ) const = 0;
// Return the number of rows in the table.
// Row iterator methods work for both keyed and unkeyed tables..
virtual void
tableFirstRow( ) const = 0;
virtual void
tableNextRow( ) const = 0;
```

TABLE 8-continued

```
        virtual bool
        tableIsEnd( ) const = 0;
        // = UNKEYED TABLE NODES
        virtual int
        tableRowIndex( ) const = 0;
        // Return the current table row, or −1 if there are no rows in the table
        virtual EApbResult
        tableSetRowIndex(uint32_t aRowIndex) const = 0;
        // Set the current row to the specified row.
        // = KEYED TABLE NODES
        // A table is keyed when there is a key column specified in the XML.
        // The library will assert if the current parent is not a keyed table.
        virtual EApbResult
        tableSetRowKey(const CApbValue& aKeyValue) const = 0;
        // Moves to the row containing the specified key value.
        // Returns APB_RESULT_VALUE_UNSPECIFIED if aKeyValue not found
        virtual EApbResult
        tableKey(CApbValue& aKeyValue) const = 0;
        // Returns the value of the key field for the current row.
        virtual EApbResult
        tableListKeys(AtoVector<CApbValue>& aKeyList) const = 0;
        // List the keys in the table
        virtual bool
        tableHasKey(const CApbValue& aKeyValue) const = 0;
};
//---------------------------------------------------------------------
// = TITLE
//      Parcel Write Interface
//
// = CLASS TYPE
//      Interface
//
// = DESCRIPTION
//      Write Interface to a parcel instance. This interface is used for
// parcels created at the local parcel store.
class APB_EXPORT_CLASS IApfWriteParcel : public IApfReadParcel
{
public:
    virtual ~IApfWriteParcel( ) { }
    // = INSTANCE
    virtual EApbResult
    selectNode( ) = 0;
    // Select the current node. (so isActive( ) returns true)
    // Returns:
    // APB_RESULT_INVALID_OPERATION - node is not selectable, ie
    //      has instance="optional" or a selectRef
    virtual EApbResult
    deselectNode( ) = 0;
    // Deselect the current node. (so isActive( ) returns false)
    // Returns:
    // APB_RESULT_INVALID_OPERATION - node is not selectable, ie
    //      has instance="optional" or a selectRef
    // = NODE COPY
    virtual bool
    isCopyTarget(const IApfReadParcel& aSource) = 0;
    // Determine whether this parcel is a valid target for copying the current
    // node or table rows the source parcel.
    virtual EApbResult
    copyNode(const IApfReadParcel& aSource) = 0;
    // Copy aSource's current node tree into this parcel
    virtual EApbResult
    copyRow(const IApfReadParcel& aSource) = 0;
    // Copy the current row from aSource's current table or keyed table node into
    // the equivalent table or set in this parcel.
    // If copying a keyed table, the row will replace any existing row with the same key.
    // If copying an unkeyed table into a table, the row will always be added
    virtual EApbResult
    copyRows(const IApfReadParcel& aSource, AtoVector<CApbValue>& selectedRows) = 0;
    // Copy the specified rows from a aSource's current keyed table node into the
    // equivalent table in this parcel. The rows will replace any existing rows with
    // the same key.
    virtual EApbResult
    copyRows(const IApfReadParcel& aSource, AtoVector<uint32_t>& selectedRows) = 0;
    // Copy the specified rows from a aSource's current table node into the
    // equivalent table in this parcel. The rows will always be added.
    // = VALUE NODES
    // It is an error to call the value methods when the cursor is not
    // at an value
    virtual EApbResult
    valueSet(const CApbValue& aValue) = 0;
```

TABLE 8-continued

```
virtual EApbResult
valueSet(uint32_t aValue) = 0;
virtual EApbResult
valueSetIncrement(CApbValue& aIncrement) = 0;
// Incrementing values are supported for values and increments less than 128 bits.
// If either the value or increment is longer, returns APB_RESULT_VALUE_RANGE_ERROR.
// = ARRAY NODES
// It is an error to call the array methods when the cursor is not
// at an array
virtual EApbResult
arrayRemove(uint32_t aStart, uint32_t aCount = 1) = 0;
// Remove aCount array items from aStart (inclusive)
virtual EApbResult
arrayClear( ) = 0;
// Remove all permitted items in array (to minCount)
virtual EApbResult
arrayResize(uint32_t aCount) = 0;
virtual EApbResult
arrayAddFirst(const CApbValue& aValue) = 0;
virtual EApbResult
arrayAddLast(const CApbValue& aValue) = 0;
virtual EApbResult
arrayAddBefore(const CApbValue& aValue, uint32_t aIndex) = 0;
virtual EApbResult
arrayAddAfter(const CApbValue& aValue, uint32_t aIndex) = 0;
virtual EApbResult
arraySetValue(const CApbValue& aValue, uint32_t aIndex) = 0;
virtual EApbResult
arraySet(const AtoList<CApbValue>& aList) = 0;
virtual EApbResult
arraySet(const AtoVector<CApbValue>& aVector) = 0;
// = TABLE OPERATIONS
virtual EApbResult
tableRemoveRow( ) = 0;
// Remove the current table row
EApbResult
tableClear( );
// Clear all rows in the table
// UNKEYED TABLE
// A table is unkeyed when there is no key column specified in the XML.
// These methods will return APB_RESULT_INVALID_OPERATION if table has a key,
// or are attempting to resize the table beyond its specified row limits.
virtual EApbResult
tableResize(uint32_t aNumRows) = 0;
// tableResize will set the current row to the first row
// Returns APB_RESULT_INVALID_OPERATION if node is not a keyed table
virtual EApbResult
tableAddLast( ) = 0;
// Add a new row to the end of table. The new row becomes the current row.
// Returns APB_RESULT_INVALID_OPERATION if node is not a keyed table
virtual EApbResult
tableAddBefore( ) = 0;
// Add a new row before the current row. The new row becomes the current row.
// Returns APB_RESULT_INVALID_OPERATION if node is not a keyed table
virtual EApbResult
tableAddAfter( ) = 0;
// Returns APB_RESULT_INVALID_OPERATION if node is not a keyed table
// KEYED TABLE
// A table is keyed when there is a key column specified in the XML.
// These methods will return APB_RESULT_INVALID_OPERATION if table has no key,
// or is attempting to resize the table beyond its specified row limits.
virtual EApbResult
tableAddRow(const CApbValue& keyValue) = 0;
// Returns APB_RESULT_INVALID_OPERATION if duplicate key value
virtual EApbResult
tableRemoveRow(const CApbValue& keyValue) = 0;
// Returns APB_RESULT_INVALID_OPERATION if keyValue not found
// = MULTI-EDIT
// Multi-edit features are only available on write parcels
virtual bool
isMultiEditParcel( ) const = 0;
// Query whether the parcel is a multi-edit parcel.
// = NODE MARKING
virtual void
parcelResetChangeMarks( ) = 0;
virtual bool
isParcelChanged( ) const = 0;
virtual bool
isNodeChanged( ) const = 0;
```

TABLE 8-continued

```
    virtual bool
    isRowChanged( ) const = 0; // applies to table and keyed table nodes
    virtual bool
    isIncrementChanged( ) const = 0;
    virtual bool
    isNodeCommon( ) const = 0;
    virtual bool
    isIncrementCommon( ) const = 0;
    virtual bool
    isNodeOverridden( ) const = 0;
    virtual bool
    isIncrementOverridden( ) const = 0;
};
#endif // APF__PARCEL__H
```

It may be preferable to provide a series of routines for the management of parcels. Such management can be provided by the client applications, e.g. the host 302 and the protocol emulator card 304 in the embodiment shown in FIG. 3. However, it may prove beneficial to provide a collection of management routines which may be linked to by the client applications, such routines are collectively referred to herein as a parcel store. Preferably, a parcel store is provided by each software component that communicates using parcels. By way of example a parcel store may be responsible for: creating parcels on behalf of clients; encoding and sending parcels to a destination parcel store (e.g. serialization); decoding and buffering incoming parcels from another parcel store; and notifying clients when new parcel data is available. Table 9 provides a sample of self-documented code for an interface to a parcel store.

TABLE 9

```
#ifndef APF__PARCEL__STORE__H
#define APF__PARCEL__STORE__H
// ===========================================================================
//
// = LIBRARY
//      APF Agilent Protocol Framework
//
// = FILENAME
//      ApfParcelStore.h
//
// = DESCRIPTION
//
// Interface to the parcel store
//
// = AUTHORS
//      Geoff Smith
//
// = COPYRIGHT
//      (C) Copyright 2004 Agilent Technologies
//
// ===========================================================================
#include "emuframework/include/apfParcel.h"
class IApfParcelBuffer;
//---------------------------------------------------------------
// = TITLE
//      Parcel Store
//
// = CLASS TYPE
//      Interface
//
// = DESCRIPTION
// Client interface to the Parcel Store
class APB__EXPORT__CLASS IApfParcelStore
{
public:
    // = FOUNDATION
    virtual ~IApfParcelStore( ) { }
    // = ACCESS
    virtual void
    listSessions(AtoVector<uint32__t>& sessionList) const = 0;
    virtual uint32__t
    port(uint32__t aSession) const = 0;
    virtual IApfRefEmulation*
    refEmulation(uint32__t aSession) const = 0;
    virtual uint32__t
    maxIteration(uint32__t aSession) const = 0;
    // = OUTGOING PARCELS
    virtual IApfWriteParcel*
    createParcel(uint32__t aSession, const AtoString& aParcelName) = 0;
    // Specify aSession = 0 for a global parcel
```

TABLE 9-continued

```
        virtual void
        deleteParcel(uint32_t aSession, IApfWriteParcel* pParcel) = 0;
        virtual void
        sendParcel(uint32_t aSession, IApfWriteParcel* pParcel) = 0;
        // Specify aSession = 0 for global parcels.
        // = PARCEL FUNCTIONS
        virtual EApbResult
        refreshParcel(uint32_t aSession, IApfWriteParcel* pParcel) = 0;
        // For duplex parcels only. Copies the most recent read-only parcel into the write parcel
        virtual EApbResult
        copyParcel(uint32_t aSession, const IApfReadParcel* pParcelIn, IApfWriteParcel* pParcelOut) = 0;
        // Copy parcel pParcelIn to new parcel pParcelOut
        // pParcelOut may or may not already exist
        // = Multi-Edit
        virtual EApbResult
        createMultiEditParcel(uint32_t aSession, AtoVector<IApfWriteParcel*>& aSelectedParcels,
        IApfWriteParcel** ppMultiEditParcel) = 0;
        // Create a multi-edit parcel from the selected parcels, which must all be share the same IApfRefParcel type.
        // The multi-edit parcel may be modified as an ordinary parcel, and the changes subsequently
        // applied to all the selected parcels. However, a multi-edit parcel may not be sent to the destination.
        // Returns:
        // APB_RESULT_INVALID_INTERFACE - at least of the selected Pdus does not exist
        // APB_RESULT_INVALID_OPERATION - unable to identify common element structure across selectedPdus.
        virtual EApbResult
        applyMultiEditParcel(uint32_t aSession, IApfWriteParcel* pMultiEditParcel,
        AtoList<IApfWriteParcel*>& aChangedParcels) = 0;
        // Apply a multi-edit parcel to each of the parcels from which it was originally created, and which still
        // remain in the parcel store. A list of changed parcels is returned to the client.
        // Only changes that have been specifically made to the multi-edit parcel will be applied to each changed parcel.
        // Returns:
        // APB_RESULT_INVALID_INTERFACE - pMultiEditParcel is not a valid multi-edit parcel
        // = INCOMING COMMAND PARCELS
        // A client may subscribe to be notified on receipt of specific command parcels.
        // Specify aSession = 0 for global commands
        virtual void
        subscribeCommandParcel(uint32_t aSession, const AtoString& aParcelName,
AtoObserverBC<IApfReadParcel>& aObserver) = 0;
        virtual void
        unsubscribeCommandParcel(uint32_t aSession, const AtoString& aParcelName,
AtoObserverBC<IApfReadParcel>& aObserver) = 0;
        // = INCOMING PARCEL BUFFERS
        // Incoming session parcels are buffered according to the parcel's buffer type.
        // Access to the parcel is via the IApfParcelBuffer interface.
        // Specify aSession = 0 for global parcels.
        virtual IApfParcelBuffer*
        getBufferByName(uint32_t aSession, const AtoString& aParcelName) const = 0;
        virtual IApfparcelBuffer*
        getBufferByClass(uint32_t aSession, EApfParcelClass aClass) const = 0;
};
//-------------------------------------------------------------------
// = TITLE
//      Parcel Buffer
//
// = CLASS TYPE
//      Interface
//
// = DESCRIPTION
// Interface to a incoming parcel buffer. The buffer provides access to
// a single parcel object, which exists for the lifetime of the buffer.
// Depending on the buffer type, incoming parcel updates may be queued, or
// automatically applied to the parcel object as follows:
// Buffer type Action
// RETAIN & FIFO Queue incoming parcels and leave parcel object unchanged, unless
//         parcel object is currently CLOSED.
// NEWEST & FETCH Update the parcel object with the incoming parcel
class APB_EXPORT_CLASS IApfParcelBuffer
{
public:
        // = FOUNDATION
        virtual ~IApfParcelBuffer( ) { }
        // = PARCEL EVENTS
        virtual void
        subscribeBufferUpdates(AtoObserverBC<IApfParcelBuffer*>& anObserver) = 0;
        virtual void
        unsubscribeBufferUpdates(AtoObserverBC<IApfparcelBuffer*>& anObserver) = 0;
        virtual bool
        isObsolete( ) const = 0;
        // An obsolete buffer is in the process of being deleted, because the session
        // is being removed. Any observers at that point are notified, so that they
        // may immediately unsubscribe and take any remedial action.
```

TABLE 9-continued

```
        // For this reason, client observers should always check if the buffer is obsolete.
        // = ACCESS
        virtual EApfBufferType
        bufferType( ) const = 0;
        virtual uint32_t
        sessionHandle( ) const = 0;
        virtual IApfReadParcel&
        parcel( ) = 0;
        virtual const IApfReadParcel&
        parcel( ) const = 0;
        virtual void
        fetchUpdate( ) = 0;
        // Send a request to the parcel's server to send the parcel. Intended primarily
        // for buffer type == FETCH. This method must be used to update the parcel if the
        // current parcel state is CLOSED.
        // = BUFFER MANAGEMENT (FIFO and RETAIN buffer types only)
        virtual uint32_t
        bufferCount( ) const = 0;
        // See setMaxParcelCount( ) below
        virtual void
        popBuffer( ) = 0;
        // Refresh the parcel with the next parcel in the buffer. Client must ensure
        // that bufferCount( ) is > 0. popBuffer( ) reduces the buffer count by 1.
        virtual void
        useBuffer(uint32_t aIndex) = 0;
        // Refresh the parcel with the specified buffer entry. Client must ensure
        // that aIndex < parcelCount( ). setParcel( ) does not affect the parcel count.
        virtual void
        deleteBuffer(uint32_t aIndex) = 0;
        virtual void
        clearBuffers( ) = 0;
        // Delete all buffers
        // The parcel buffer has a default max buffer count of 1. This avoids
        // the possiblity of a memory leak caused by multiple proxies receiving parcels into
        // FIFO or RETAIN buffers, when not all proxies have an active client to manage the
        // buffer.
        // If a client wants a buffer to hold more than one parcel, it sets the max count
        // explicitly.
        virtual uint32_t
        maxBufferCount( ) const = 0;
        // Default = 1. Adjust using setMaxBufferCount( )
        virtual void
        setMaxBufferCount(uint32_t aCount) = 0;
        // Effective only for RETAIN and FIFO buffers.
};
#endif// APF_PARCEL_STORE_H
```

One basic function of the afore-described parcel store that may be desirable in any messaging system is buffering. In general, buffering means the temporary holding of parcels until the receiving (or transmitting) system is prepared to process the information contained in the parcel. For example, parcels can be pulled by a client from a buffer on the transmitting side when needed to minimize host load. Alternatively, parcels can be pushed by the transmitting side to a variety of types of buffers on the receiving side to optimize responsiveness. The type of buffer can be specified in the XML parcel definition and made known by the parcel reference model. Alternatively the type could be determined based on information in the serialized parcel. The application can be performance tuned by adjusting the parcel buffer types in the XML without impacting the client interface or requiring software to be re-written or re-compiled.

Some examples of suitable buffer types are disclosed in Table 10:

TABLE 10

| Buffer Type | Description |
| --- | --- |
| retain | (Push) Each new parcel version received is retained in a circular buffer until deleted by the client |
| fifo | (Push) Parcels are placed in a FIFO buffer and deleted from the buffer when read by the client |
| newest | (Push) The buffered parcel is replaced by the most recent incoming version. Parcels with a root key specified may be consolidated according to the key value. This feature allows parcels from many sources to be automatically consolidated into a summary parcel at the destination. |
| fetch | (Pull) Parcels are not sent to the destination store until requested by the destination |

To conserve bandwidth, parcels may be serialized prior to sending. As used here the term serialization generally refers to a process whereby the data in a parcel is stripped out and arranged in a serial manner, typically based on the index of each of the elements. A minimal amount of identification material is provided in the header of the serialized parcel to enable the reconstruction of the parcel on the receiving end. Table 11 describes one possible process of serialization for the various elements of a parcel.

TABLE 11

| Parcel entity | How it is serialized |
|---|---|
| Value (empty) | 1 byte code = PCL_NODE_DATA_EMPTY |
| Value (<=8 bits long) | 1 byte code = PCL_NODE_DATA_INT8 + 1 byte data |
| Value (8 < length <= 32 bits) | 1 byte code = PCL_NODE_DATA_INT32 + 4 bytes data |
| Value (32 < length <= 255 bits) | 1 byte code = PCL_NODE_DATA_BS255 + 1 byte length + length bytes data |
| Value length >= 255 bits | 1 byte code = PCL_NODE_DATA_BSLONG + 4 bytes length + length bytes data |
| Array | Array count saved as a value + count values |
| Set | Each member saved in sequence |
| Table | Row count saved as a value + count sets |

Miscellaneous

Although certain embodiments of the present invention have been shown and described, it will be appreciated by those skilled in the art that changes may be made in these embodiments without departing from the principles and spirit of the invention, the scope of which is defined in the claims and their equivalents.

For example, one benefit of using a parcel structure, including definition and reference model is that the construction of graphical user interface (GUI) elements can be automated. In other words the contents of a parcel can be displayed using a format that is derived based upon the parcel itself. By parsing the parcel definition or reference model an interface can be built on the fly. Such an interface can be used for viewing the contents of a packet or packet creation and editing.

FIG. 6 shows an interface constructed based on the table structure defined in the parcel definition contained in Table 13.

TABLE 13

```
<parcel name="sessionSummary"
    <table name="sessions">
        <value name="Name"/>
        <value name="Protocol"/>
        <value name="State"/>
        <value name="Tester"/>
        <value name="SUT"/>
    </table>
</parcel>
```

Figure 7:
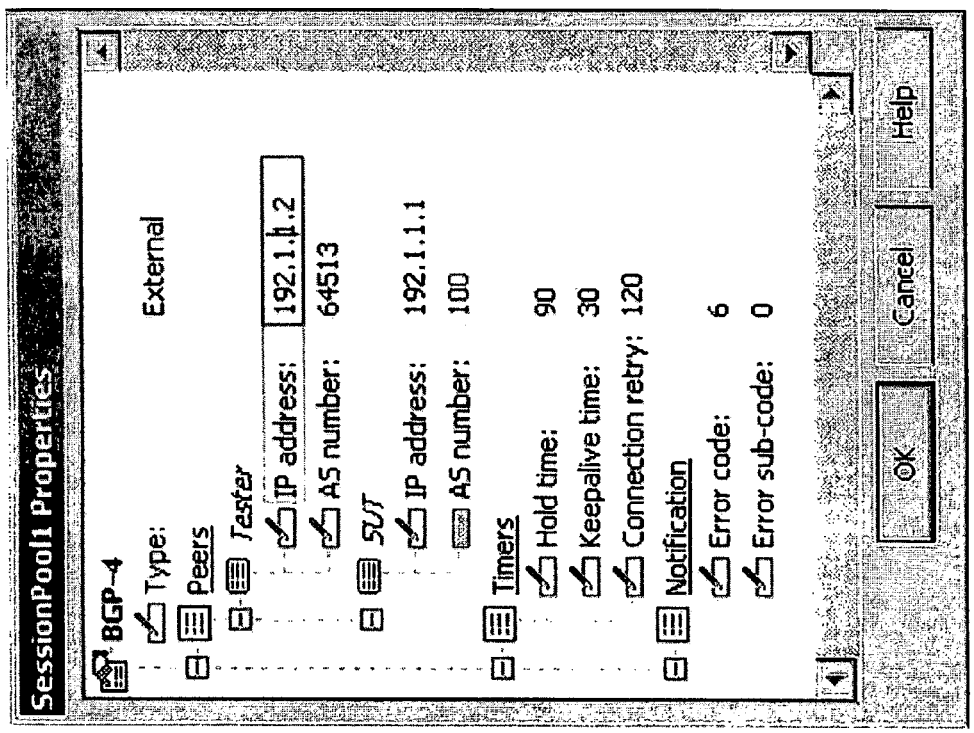
FIG. 7 is a screen capture of an interface constructed based on a sets of values defined in a parcel definition.

FIG. 7 shows an interface constructed based on the sets of values defined in the parcel definition contained in Table 14. In FIG. 7, a tree structure is selected to emphasize the hierarchical nature of the data described in the definition.

TABLE 14

```
<parcel name="bgpSessionData"
    <value name="Type"/>
    <set name="Peers">
        <set name="Tester">
            <value name="IP address"/>
            <value name="AS number"/>
        </set>
        <set name="SUT">
            <value name="IP address"/>
            <value name="AS number"/>
        </set>
    </set>
    <set name="Timers">
        <value name="Hold time"/>
        <value name="Keep-alive time"/>
        <value name="Connection retry"/>
```

TABLE 14-continued

```
        </set>
        <set name="Notification">
            <value name="Error code"/>
            <value name="Error sub-code"/>
        </set>
</parcel>
```

Another example of changes may be made in these embodiments without departing from the principles and spirit of the invention is the provision of a facility to iteratively create parcel instances. For example, should a series of parcel be desirable wherein one or more values differ as between parcels, an iterative function can be provided defining those parcel values in relative terms, such as +1. In this way a single parcel can be used to parametrically generate many different parcels through use of parcel iteration. Using the example of a protocol emulation application, it may be desirable to create a session pool of many sessions, defined using just one session's parcels. This can be implemented by tagging certain values in the XML model with default increment attributes. The increment is used to adjust each value for each iteration of the parcel. For example, a value may specify a default increment of "10". If in the first parcel, the value is 50, when the parcel is iterated once, the value will be 60. If the parcel is iterated twice, the value will be 70. The default increment can also be calculated by an increment function. This allows the default increment value to be intelligently assigned based on other values in the parcel.

What is claimed is:

1. A method of transferring data from a host to a protocol emulator, the method comprising: preparing a description of the structure of the data; providing the description of the data to the host and the protocol emulator; creating, during runtime, a reference model of the data structure using the description of the data on each of the host and the protocol emulator, wherein creating the reference model comprises creating a node for each element of the data and indexing the nodes of the reference model; as requested, creating an instance of the reference model with the data on the host; serializing the data in the instance, wherein serializing the data in the instance comprises forming a binary file in which the data is ordered in a linear manner based upon the index of the node from which each element of data was taken; transferring the serialized data from the host to the protocol emulator; and creating an instance of the data on the protocol emulator based on the reference model, wherein the serialized data includes at least one command for creating a protocol emulation session.

2. The method, as set forth in claim 1, wherein the step of preparing a description of the structure of the data comprises creating an XML file that describes the structure of data.

3. The method, as set forth in claim 1, wherein the description of the structure of the data includes calls to external processes.

4. The method, as set forth in claim 1, wherein the description of the structure of the data includes values that are based on other values within the data structure.

5. The method, as set forth in claim 1, wherein the step of preparing a description of the structure of the data comprises describing the data in a hierarchical manner.

6. The method, as set forth in claim 1, wherein the step of preparing a description of the structure of the data comprises describing the data using tables.

7. The method, as set forth in claim 1, wherein the step of preparing a description of the structure of the data comprises describing the data in a hierarchical manner and using tables.

8. The method, as set forth in claim 1, wherein the step of preparing a description of the structure of the data comprises describing the data using defined elements comprising at least one selected for the set consisting of: value, array, set, table, and keyed table.

9. The method, as set forth in claim 1, wherein the step of preparing a description of the structure of the data comprises defining elements for holding values or other elements and attributes of the elements.

10. The method, as set forth in claim 9, wherein the attributes include a descriptive name of the element, a description of the element, a length of the element, a presentation format of the element, and a range of possible values for the element.

11. The method, as set forth in claim 1, wherein the step of serializing the data comprises creating an XML file.

12. A method of communicating between a host and a protocol emulator, the method comprising: preparing a description of a structure of data required to control the protocol emulator; providing the description of the data to a host and the protocol emulator; creating, during run time, a reference model of the data structure using the description of the data on each of the host and the protocol emulator, wherein creating the reference model comprises creating a node for each element of the data and indexing the nodes of the reference model; as requested, creating an instance of the reference model with the data on the host; serializing the data in the instance, wherein serializing the data in the instance comprises forming a binary file in which the data is ordered in a linear manner based upon the index of the node from which each element of data was taken; transferring the serialized data from the host to the protocol emulator; and creating an instance of the data on the protocol emulator based on the reference model, wherein the serialized data includes at least one command for creating a protocol emulation session.

13. The method, as set forth in claim 12, wherein the step of preparing a description of the structure of the data comprises creating an XML file that describes the structure of the data.

14. The method, as set forth in claim 12, wherein the description of the structure of the data includes calls to external processes.

15. The method, as set forth in claim 12, wherein the description of the structure of the data includes values that are based on other values within the data structure.

16. The method, as set forth in claim 12, wherein the step of preparing a description of the structure of the data comprises describing the data in a hierarchical manner.

17. The method, as set forth in claim 12, wherein the step of preparing a description of the structure of the data comprises describing the data using tables.

18. The method, as set forth in claim 12, wherein the step of preparing a description of the structure of the data comprises describing the data in a hierarchical manner and using tables.

19. The method, as set forth in claim 12, wherein the step of preparing a description of the structure of the data comprises describing the data using defined elements comprising at least one selected for the set consisting of: value, array, set, table, and keyed table.

20. The method, as set forth in claim 12, wherein the step of preparing a description of the structure of the data comprises defining elements for holding values or other elements and attributes of the elements.

21. The method, as set forth in claim 20, wherein the attributes include a descriptive name of the element, a description of the element, a length of the element, a presentation format of the element, and a range of possible values for the element.

22. The method, as set forth in claim 12, wherein the step of serializing the data comprises creating an XML file.

23. The method, as set forth in claim 12, further comprising: as requested, creating an instance of the reference model with a second set of data on the protocol emulator; serializing the second set of data in the instance; transferring the serialized second set of data from the protocol emulator to the host; and creating an instance of the second set of data on the host based on the reference model.

24. The method, as set forth in claim 12, wherein the data comprises at least one of commands; session data; and topology.

25. The method, as set forth in claim 23, wherein the second set of data comprises at least one of statistics; topology; and message trace.

26. The method, as set forth in claim 12, the step of creating comprises: creating a plurality of instances of the reference model with the data on the host, wherein each instance varies based on instructions provided by a user.

27. A system for transferring data from a physical host to a protocol emulator, the system comprising: a physical host including a description of a structure of a set of data; software operable on the physical host that creates, during run time, a reference model of the data structure using the description of the data on each of the physical host and the protocol emulator, wherein creating the reference model comprises creating a node for each element of the data and indexing the nodes of the reference model, and, as requested, creates an instance of the reference model populated with a set of data; communication software operable on the physical host that serializes and transmits the set of data in the instance, wherein serializing the data in the instance comprises forming a binary file in which the data is ordered in a linear manner based upon the index of the node from which each element of data was taken; and a server that receives the serialized set of data and creates an instance of the set of data on the protocol emulator based on the reference model, wherein the serialized data includes at least one command for creating a protocol emulation session.

28. The system, as set forth in claim 27, wherein the server is provided with the description of the structure of the data and creates a copy of the reference model using the description.

29. The system, as set forth in claim 28, wherein the physical host provides the server with the description upon startup.

30. The system, as set forth in claim 27, wherein the server comprises a protocol emulator and the data comprises commands, session data, and topology information.

31. The system, as set forth in claim 27, further comprising: software operable on the server that creates a second reference model of a second data structure using the description of the structure of the second data structure and as requested, creates an instance of the second reference model populated with a second set of data; and communication software operable on the server computer that serializes the second set of data in the instance and transmits the serialized data to the physical host.

32. The system, as set forth in claim 29, wherein the server comprises a protocol emulator and the second set of data comprises at least one of statistics; topology; and message trace.

33. The system, as set forth in claim 27, wherein the software instantiates the reference model a plurality of times to create a plurality of objects.

34. The system, as set forth in claim 27, wherein each object varies from other objects in a defined manner.

35. The system, as set forth in claim 27, further comprising: an application programming interface for interfacing with the software in a manner independent of the data.

36. The system, as set forth in claim 27, further comprising: a graphics user interface that dynamically constructs an interface based on the reference model.

37. The system, as set forth in claim 27, wherein the reference model includes attributes describing the data.

38. The system, as set forth in claim 37, further comprising: a graphics user interface that dynamically constructs an interface for displaying data in the instance of the reference model based on the attributes contained in the reference model.

* * * * *